United States Patent [19]
Scobbo, Jr. et al.

[11] Patent Number: 5,346,953
[45] Date of Patent: Sep. 13, 1994

[54] CORE-SHELL ABS COPOLYMERS AND METHOD FOR THEIR PREPARATION

[75] Inventors: James J. Scobbo, Jr., Guilderland; Gregory J. Stoddard, Schenectady, both of N.Y.

[73] Assignee: General Electric Company, Schenectady, N.Y.

[21] Appl. No.: 132,951

[22] Filed: Oct. 7, 1993

Related U.S. Application Data

[62] Division of Ser. No. 15,958, Feb. 8, 1993, abandoned.

[51] Int. Cl.$^5$ .............. C08L 51/04; C08L 33/04; C08L 33/20; C08F 279/02
[52] U.S. Cl. .............. 525/74; 525/77; 525/80; 525/83; 525/84; 525/285; 525/286; 525/293; 525/902
[58] Field of Search ......... 525/74, 73, 77, 902, 525/83, 84, 285, 286, 293

[56] References Cited

U.S. PATENT DOCUMENTS

| | | | |
|---|---|---|---|
| 3,971,743 | 7/1976 | Breslow | 526/273 |
| 4,336,177 | 6/1982 | Backhouse et al. | 525/902 |
| 4,761,463 | 8/1988 | Matsumoto et al. | 525/74 |
| 4,870,131 | 9/1989 | Pisipati et al. | 525/74 |
| 4,886,856 | 12/1989 | Chen et al. | 525/74 |
| 5,001,194 | 3/1991 | Henton | 525/74 |
| 5,047,475 | 9/1991 | Ogawa et al. | 525/74 |

*Primary Examiner*—James J. Seidleck
*Assistant Examiner*—Warzel Mark L.
*Attorney, Agent, or Firm*—William H. Pittman

[57] ABSTRACT

Core-shell ABS copolymers having an SAN shell completely surrounding the diene core are provided by melt blending an aliphatic diene polymer with an SAN copolymer, said copolymer containing functional groups capable of reacting with the diene polymer. For example, the SAN copolymer may contain azide groups capable of reacting with the olefinic groups in the diene polymer, or both the SAN copolymer and the diene polymer may contain other functional groups capable of interreaction, such as acidic (e.g., maleic anhydride) groups in the diene and epoxy (e.g., glycidyl methacrylate) groups in the SAN copolymer.

6 Claims, No Drawings

CORE-SHELL ABS COPOLYMERS AND METHOD FOR THEIR PREPARATION

This application is a division, of application Ser. No. 08/015,958, filed Feb. 8, 1993, now abandoned.

This invention relates to the preparation of core-shell copolymers, and more particularly to the preparation of copolymers of aliphatic dienes, alkenylaromatic compounds and ethylenically unsaturated nitriles.

Various copolymers of aliphatic dienes, alkenylaromatic compounds and ethylenically unsaturated nitriles are known. The monomers involved are most often butadiene, styrene and acrylonitrile, and the polymers thereof are generically designated "ABS resins". They are most often produced by initially preparing a polybutadiene seed latex and copolymerizing styrene and acrylonitrile in emulsion in the presence thereof.

An intermediate copolymer which may be formed in this process, hereinafter designated "high rubber graft", is a copolymer at least partially in core-shell form in which the principal constituent of the elastomeric core is polybutadiene, prepared in emulsion as a latex. A styreneacrylonitrile copolymer (hereinafter sometimes "SAN") is present partially as occluded domains in the polybutadiene and partially as a shell around the polybutadiene particles.

A typical high rubber graft comprises about 40–60%, typically about 50%, polybutadiene (all percentages herein being by weight) and about 40–60% SAN. About 35–45% by weight of the SAN, representing about 18–23% of total polymer, is chemically bound to the polybutadiene latex particles, either as a shell on the surfaces thereof or as an internal occluded material; the remainder of the SAN is unbound.

It is also conventional to melt blend the high rubber graft with additional SAN copolymer to produce a blend containing about 15% polybutadiene. Such a blend is the principal constituent of many varieties of commercial ABS resins, which may also contain other materials such as antioxidants.

The morphology of ABS resins may be studied by transmission electron microscopy. In a typical scanning operation, the ungrafted SAN continuous phase is removed by dissolution in acetone and the remaining core-shell particles are dispersed in a solution of polybutadiene in toluene. The toluene is removed by evaporation and the residue is molded in a block of epoxy resin. Said block is stained with osmium tetroxide and thin sections are microtomed and imaged on a transmission electron microscope. The polybutadiene particles receive the stain and are darkened, while the SAN portion remains light colored.

It is uniformly observed that a portion of the SAN forms occlusions within the polybutadiene particles, while the remainder forms an incomplete shell around said particles. Said shell typically has a "raspberry" configuration with droplet-shaped shell regions separated by areas of exposed polybutadiene.

Such shell-free regions are points of stress field discontinuity. Stresses in molded ABS articles are, in the ideal situation, transmitted uniformly through the shell to the elastomeric core particles, where they are dissipated. Stress field discontinuities, however, may cause non-uniform stress transfer and adversely affect the performance of the molded article. In addition, it is possible for diene polymer with an incomplete shell to agglomerate and be poorly dispersed in the external SAN matrix.

It is desirable, therefore, to provide a method for forming core-shell ABS and similar copolymers in which the shell completely, or substantially completely, surrounds the core particles. A method for producing such resins is provided by the present invention.

In one of its aspects, the invention is a method for preparing a core-shell copolymer in which the shell is at least partially chemically linked to the core, which comprises melt blending (A) a composition comprising an aliphatic diene polymer with (B) a copolymer of an alkenylaromatic compound and an ethylenically unsaturated nitrile, said copolymer B containing functional groups capable of reacting with said diene polymer.

The aliphatic dienes, alkenylaromatic compounds and ethylenically unsaturated nitriles employed in the present invention are well known compounds. Examples of dienes are butadiene, isoprene and chloroprene. Alkenylaromatic compounds include styrene, α-methylstyrene and vinyltoluenes. Ethylenically unsaturated nitriles include acrylonitrile and methacrylonitrile.

By reason of the commercial availability of butadiene, styrene and acrylonitrile as well as their particular suitability, they are the monomers usually employed in the present invention and reference will frequently be made specifically to them hereinafter. It should be understood, however, that other suitable monomers may be substituted therefor when appropriate.

Component A according to the present invention is a composition comprising an aliphatic diene polymer. It is generally prepared in aqueous emulsion, in the form of a latex. Most often, butadiene is first polymerized to form a seed latex to which styrene and acrylonitrile are subsequently added.

Thus, it is apparent that component A may also contain SAN copolymer, which may be at least partially chemically bound to the surface of the polybutadiene particles. The aforementioned high rubber graft compositions are generally preferred as component A.

Component B is a copolymer of said ethylenically unsaturated nitrile and alkenylaromatic compound, and is typically an SAN copolymer. It most often contains about 50–85% styrene units, based on total styrene and acrylonitrile units.

Copolymers suitable for use as component B may be prepared by art-recognized methods, including bulk and solution methods. Solution copolymerization is frequently employed.

For the purposes of the present invention, it is essential that the SAN copolymer contain functional groups capable of reacting with the diene polymer. Various embodiments of the invention may be employed for this purpose.

In one embodiment, the SAN copolymer additionally contains units capable of reacting with the olefinic groups in the diene polymer. Said units may contain, for example, azide groups provided by incorporating in the SAN copolymer units derived from an ethylenically unsaturated azide such as vinylbenzyl azide.

In another embodiment, the diene polymer and SAN copolymer contain other units which have functional groups capable of interreaction. For example, the diene polymer may contain acidic units derived from a monomer such as maleic anhydride, and the SAN copolymer may contain epoxy units derived from a monomer such as glycidyl methacrylate.

The interreactive groups may be introduced by simultaneous polymerization or by grafting. It is generally convenient to functionalize component B by simultaneous polymerization of styrene, acrylonitrile and the reactive monomer, and to functionalize component A by grafting a suitable monomer onto the high rubber graft, principally onto the diene polymer therein, most often in the presence of a free radical initiator such as dicumyl peroxide. The proportion of monomers containing the desired functional groups is generally about 0.5–50% based on total component A or SAN copolymer, respectively.

According to the invention, components A and B as defined above are melt blended. Conventional batch or continuous melt blending operations may be employed. Extrusion is frequently preferred by reason of its particular effectiveness and capability of continuous operation. It may be performed in a single- or twin-screw extruder, typically at temperatures in the range of about 200°–300° C.

Transmission electron microscopy of the products prepared by the method of this invention, after treatment as described hereinabove, show that they are in core-shell form, with the core comprising diene polymer (and usually occluded SAN) and the shell being SAN copolymer. Said shell completely surrounds the particles of said core and is chemically linked to said particles. Such core-shell copolymers are another aspect of the invention.

The core-shell copolymers of this invention demonstrate excellent impact strengths and tensile properties, generally superior to those of similar materials in which no chemical link between the core and the shell is present. For example, a core-shell copolymer prepared by grafting maleic anhydride on a high rubber graft in the presence of a free radical initiator and subsequently melt blending with conventional SAN and a SAN copolymer containing glycidyl methacrylate units is superior in impact strength to similar blends prepared without the maleic anhydride, despite the fact that the presence of a glycidyl methacrylate-containing SAN generally degrades impact properties. By contrast, the employment of a maleic anhydride-grafted high rubber graft in combination with an unfunctionalized SAN produces a blend with an impact strength inferior to those of similar blends not containing the maleic anhydride. The tensile strength at yield of the composition of the invention is also noticeably superior, while tensile strength at break, tensile modulus and elongation are comparable. The compositions of the invention also exhibit substantially lower gloss than similar compositions prepared without the presence of a chemical bond between the core and the shell.

The invention is illustrated by the following examples. All parts are by weight unless otherwise indicated.

EXAMPLE 1

A mixture of 100 grams (655 mmol.) of vinylbenzyl chloride (mixture of m- and p-isomers), 42.6 grams (655 mmol.) of sodium azide and 500 ml. of dimethylformamide was stirred at room temperature for 24 hours. Ethyl ether, 500 ml., was then added and the mixture was extracted with two 300-ml. portions of water. The combined aqueous phases were extracted with 500 ml. of ethyl ether, and the combined organic layers were dried over magnesium sulfate, filtered and evaporated to yield 105 grams (100% of theoretical) of vinylbenzyl azide. The structure was confirmed by proton and carbon-13 nuclear magnetic resonance spectroscopy and infrared spectroscopy.

A mixture of 726 grams (6.98 moles) of styrene, 242 grams (4.56 moles) of acrylonitrile, 18.3 grams (115 mmol.) of vinylbenzyl azide, 3.83 grams (23.3 mmol.) of azobisisobutyrylnitrile and 1.5 liters of methyl ethyl ketone was purged with nitrogen for 5 minutes and stirred at 70° C. for 24 hours. It was then cooled to room temperature and precipitated into methanol in a blender. The desired vinylbenzyl azide-functionalized SAN was filtered, washed with methanol and dried at 60° C. In a vacuum oven for 48 hours. The yield was 750 grams (76% of theoretical). Fourier transform infrared spectroscopy confirmed the presence of the azide group.

A mixture of 30 parts of a high rubber graft consisting of 50% polybutadiene and 50% SAN with a 75:25 weight ratio of styrene to acrylonitrile units, in which 40% of the SAN was chemically bound to the polybutadiene, was tumble blended with 30 parts of the azide-functionalized SAN and 40 parts of a similar unfunctionalized SAN. The dry blend was extruded on a twin-screw extruder at temperatures of 120°–220° C., and the extrudate was cooled in a water bath, pelletized and dried at 80° C. for 4 hours in a recirculating air oven.

It was shown by transmission electron microscopy to be composed of core-shell particles with the SAN shell completely surrounding the polybutadiene core, presumably at least in part as a result of chemical bonds between the core and the shell.

EXAMPLE 2

A functionalized SAN was prepared by a method similar to that described in Example 1, with the substitution of 16.3 grams (115 mmol.) of glycidyl methacrylate for the vinylbenzyl azide. The yield was 790 grams (80% of theoretical). Fourier transform infrared spectroscopy showed the presence of glycidyl methacrylate units.

A high rubber graft consisting of 50% polybutadiene and 50% SAN with a 75:25 weight ratio of styrene to acrylonitrile units, in which 40% of the SAN was chemically bound to the polybutadiene, was tumble blended for several minutes with 0.25% dicumyl peroxide and 1.5% maleic anhydride. The dry blend was extruded on a twin-screw extruder at temperatures of 120°–220° C. to form an anhydride-functionalized high rubber graft as the extrudate, which was cooled in a water bath, pelletized and dried at 80° C. for 4 hours in a recirculating air oven.

A mixture of 30 parts of the anhydride-functionalized high rubber graft ("HRG"), 30 parts of glycidyl methacrylate-functionalized SAN and 40 parts of unfunctionalized SAN was prepared under the same conditions. It was injection molded into tensile strength and Izod impact strength test specimens, and the physical properties were determined in accordance with ASTM methods D638 and D256, respectively, in comparison with several controls. The results are given in the following table. SAN percentages are based on total resinous components.

|  |  | Controls |  |  |  |  |
| --- | --- | --- | --- | --- | --- | --- |
|  | Example | A | B | C | D | E |
| HRG preparation: |  |  |  |  |  |  |
| Maleic anhydride, % | Yes | No | No | Yes | No | No |
| Dicumyl peroxide, % | Yes | No | Yes | Yes | No | Yes |

-continued

| | Example | Controls A | B | C | D | E |
|---|---|---|---|---|---|---|
| Blend: | | | | | | |
| GMA-func. SAN, % | 30 | 30 | 30 | — | — | — |
| Unfunc. SAN, % | 40 | 40 | 40 | 70 | 70 | 70 |
| Notched Izod impact strength, joules/m. | 53 | 37 | 43 | 59 | 80 | 85 |
| Tensile strength, MPa.: | | | | | | |
| At yield | 59.6 | 53.9 | 55.6 | 56.8 | 56.2 | 56.3 |
| At break | 50.7 | 52.2 | 44.2 | 55.3 | 51.8 | 47.7 |
| Tensile modulus, GPa. | 13.1 | 13.2 | 12.9 | 13.3 | 12.6 | 12.8 |
| Tensile elongation, % | 13.5 | 7.4 | 13.9 | 7.5 | 8.8 | 13.3 |
| Gloss (reflectance) | 33 | 33 | 29 | 90 | 89 | 79 |

The results in the table show the superiority of the compositions of this invention in impact strength to Controls A and B in which the high rubber graft is not maleic anhydride-functionalized, and therefore cannot interreact with the SAN. The opposite trend is seen when no glycidyl methacrylate-functionalized SAN is present, as shown by Controls C-E. The tensile strength at yield of the composition of this invention was somewhat higher than those of any of the controls. Tensile yield at break and tensile modulus were comparable and tensile elongation compared favorably to those of the controls. Finally, the composition of the invention and comparable Controls A-B have substantially lower gloss than Controls C-E.

What is claimed is:

1. A core-shell copolymer comprising particles wherein the core comprises particles of a diene-maleic anhydride copolymer and the shell is a copolymer of an ethylenically unsaturated nitrile, an alkenylaromatic compound and glycidyl methacrylate, said shell completely surrounding and being chemically linked to said core particles.

2. A copolymer according to claim 1 wherein the core also comprises a copolymer of an ethylenically unsaturated nitrile and an alkenylaromatic compound.

3. A copolymer according to claim 1 wherein the diene is butadiene, the alkenylaromatic compound is styrene and the ethylenically unsaturated nitrile is acrylonitrile.

4. A core-shell copolymer comprising particles wherein the core comprises diene particles and the shell is a copolymer of an ethylenically unsaturated nitrile, an alkenylaromatic compound and vinylbenzyl azide, said shell completely surrounding and being chemically linked to said core particles.

5. A copolymer according to claim 4 wherein the core also comprises a copolymer of an ethylenically unsaturated nitrile and an alkenylaromatic compound.

6. A copolymer according to claim 5 wherein the diene is butadiene, the alkenylaromatic compound is styrene and the ethylenically unsaturated nitrile is acrylonitrile.

* * * * *